US012670007B1

(12) United States Patent
Evans et al.

(10) Patent No.: US 12,670,007 B1
(45) Date of Patent: Jun. 30, 2026

(54) VIRTUAL MACHINE MIGRATION WITH MEMORY POOLING

(71) Applicant: NVIDIA Corporation, Santa Clara, CA (US)

(72) Inventors: Jonathon Evans, Santa Clara, CA (US); Vikram Sethi, Austin, TX (US); Durgesh Srivastava, Cupertino, CA (US); James Stephen Fields, Jr., Santa Fe, NM (US)

(73) Assignee: NVIDIA Corporation, Santa Clara, CA (US)

( * ) Notice: Subject to any disclaimer, the term of this patent is extended or adjusted under 35 U.S.C. 154(b) by 483 days.

(21) Appl. No.: 18/317,295

(22) Filed: May 15, 2023

(51) Int. Cl.
$\quad$ G06F 9/455 $\quad$ (2018.01)
(52) U.S. Cl.
$\quad$ CPC .................... G06F 9/45558 (2013.01); *G06F 2009/45562* (2013.01); *G06F 2009/4557* (2013.01); *G06F 2009/45583* (2013.01)
(58) Field of Classification Search
$\quad$ None
$\quad$ See application file for complete search history.

(56) References Cited

U.S. PATENT DOCUMENTS

| | | | | | |
|---|---|---|---|---|---|
| 6,542,926 | B2 * | 4/2003 | Zalewski | .............. | G06F 9/5077 709/215 |
| 8,082,400 | B1 * | 12/2011 | Chang | .................. | G06F 9/5077 709/215 |

| | | | | | |
|---|---|---|---|---|---|
| 2014/0304354 | A1 * | 10/2014 | Chauhan | ............. | H04L 67/1095 709/213 |
| 2015/0324236 | A1 * | 11/2015 | Gopalan | ............... | G06F 9/5088 711/162 |
| 2016/0179383 | A1 * | 6/2016 | Krithivas | ............ | G06F 9/45541 711/170 |
| 2017/0364428 | A1 * | 12/2017 | Ganesan | ............. | G06F 11/2069 |
| 2019/0065231 | A1 * | 2/2019 | Schmisseur | .............. | H05K 7/18 |
| 2019/0370009 | A1 * | 12/2019 | Venkatraman | ........ | G06F 3/0616 |
| 2020/0371692 | A1 * | 11/2020 | Van Doorn | ........... | G06F 3/0631 |
| 2021/0132979 | A1 * | 5/2021 | Moffet | .................. | G06F 9/5077 |
| 2021/0132999 | A1 * | 5/2021 | Haywood | ........... | G06F 9/45558 |
| 2023/0185612 | A1 * | 6/2023 | Kini | ...................... | G06F 9/5016 718/104 |
| 2025/0021479 | A1 * | 1/2025 | Singh | ...................... | G06F 12/08 |

\* cited by examiner

*Primary Examiner* — Lewis A Bullock, Jr.
*Assistant Examiner* — Christian M Bakhit
(74) *Attorney, Agent, or Firm* — Plumsea Law Group, LLC

(57) ABSTRACT

Systems and methods for facilitating the migration of one or more virtual machines from a source computing system to a target computing system comprise an architecture with a memory pool. The memory pool is accessible by both the source computing system and the target computing system. Using this architecture, a first virtual machine instance running on the source computing system, and having virtual memory stored in the memory pool, can be migrated to the target computing system without the need to copy virtual memory between the computing systems. Migration includes copying state information about the first virtual machine instance to the target computing system. Then, a second virtual machine instance can be started on the target computing system, where the second virtual machine instance uses the virtual memory stored in the memory pool.

20 Claims, 11 Drawing Sheets

VIRTUAL MACHINE MIGRATION WITH MEMORY POOLING

TECHNICAL FIELD

The present disclosure generally relates to computer hardware, and in particular, to computer hardware for facilitating virtual machine migration.

BACKGROUND

Virtual machine migration is the process of moving a virtual machine running on one set of computing resources to another set of computing resources. Migration may be done for a variety of reasons including performing system maintenance, load balancing, collocating virtual machines, minimizing fault domain, and permanent migration to new hardware. Migration is a resource intensive process that is often performed by one or more hypervisors associated with the source and/or target computing systems. During cold migration, the virtual machine may be powered down and/or paused prior to the migration. During hot migration, the virtual machine is actively running. Therefore, during hot migration copying resources, such as pages and page tables in memory, may require many iterations as pages are continually updated by ongoing processes at the source computing system. Because of the enormous size of the pages and page tables needed for a virtual machine, this iterative process may be very slow and resource intensive.

There is a need in the art for a system and method that addresses the shortcomings discussed above.

SUMMARY

In one aspect, the embodiments described herein may relate to systems and method for facilitating the migration of one or more virtual machines from a source computing system to a target computing system. The systems include an architecture with a memory pool that is accessible by both the source computing system and the target computing system. Using this architecture, a first virtual machine instance running on the source computing system, and having virtual memory stored in the memory pool, can be migrated to the target computing system without the need to copy virtual memory between the computing systems. Instead, migration includes copying state information about the first virtual machine instance to the target computing system. Then, a second virtual machine instance can be started on the target computing system, where the second virtual machine instance uses the virtual memory stored in the memory pool.

This allows for a migration process where virtual memory does not need to be copied during migration, thereby drastically reducing migration time and reducing the load on processors in the source and/or target computing systems that are typically dedicated to copying virtual memory during migration.

In some embodiments, a data center orchestrator or other system could monitor virtual machines running on various computing systems in real time. When various triggers are detected at a source computing system running one or more virtual machines, the monitoring system may automatically initiate rapid migration of the virtual machine(s) from the source computing system to one or more target computing systems. Exemplary triggers could include temperature indicators, security indicators, error correction code indicators, and other reliability, availability and serviceability indicators.

Other systems, methods, features, and advantages of the disclosure will be, or will become, apparent to one of ordinary skill in the art upon examination of the following figures and detailed description. It is intended that all such additional systems, methods, features, and advantages be included within this description and this summary, be within the scope of the disclosure, and be protected by the following claims.

BRIEF DESCRIPTION OF THE DRAWINGS

The disclosure can be better understood with reference to the following drawings and description. The components in the figures are not necessarily to scale, emphasis instead being placed upon illustrating the principles of the disclosure. Moreover, in the figures, like reference numerals designate corresponding parts throughout the different views.

DESCRIPTION OF THE EMBODIMENTS

Figure 1:
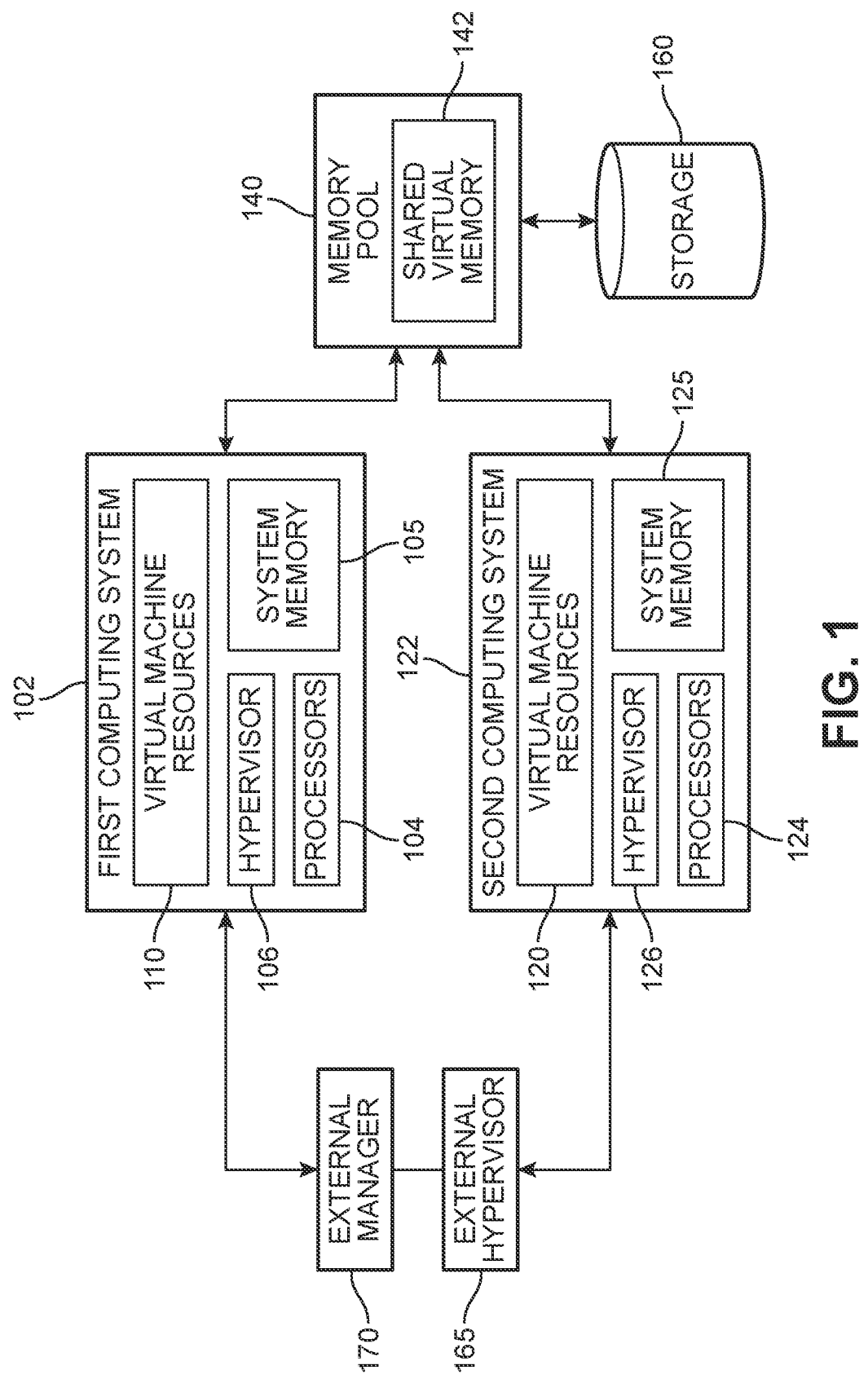
FIG. 1 is a schematic view of two computing systems that are configured to run one or more virtual machines, according to an embodiment.

FIG. 1 is a schematic view of two computing systems that are configured to run one or more virtual machines. These include a first computing system 102 and a second computing system 122. First computing system 102 is configured with first processors 104, first system memory 105, and a first hypervisor 106. First hypervisor 106 may allocate both first processors 104 and/or first system memory 105 to create first virtual machine resources 110. First virtual machine resources 110 may then be used to run one or more virtual machines (or virtual machine instances).

Second computing system 122 is configured with second processors 124, second system memory 125, and a second hypervisor 126. Second hypervisor 126 may allocate both second processors 124 and/or second system memory 125 to create second virtual machine resources 120. Second virtual machine resources 120 may then be used to run one or more virtual machines.

As used herein, the term "computing system" may refer to any individual computing devices, such as desktops, laptops, and mobile computing devices, and servers. In some cases, a computing system may comprise two or more discrete computing devices, for example, a cluster of servers. More generally, a computing system may be any designated computing node in a network of computing nodes.

Each of first computing system 102 and second computing system 122 may comprise not only processors and memory, but may also include various physical computing components such as I/O components, networking components, and other suitable computing components.

In addition to local system memory that may be integrated with corresponding processors running on each system, first computing system 102 and second computing system 122 may also share a common memory pool 140. Memory pool 140 may reside on a discrete computing component from first computing system 102 and second computing system 122, and may include either volatile or non-volatile memory components. In some cases, memory pool 140 comprises random access memory (RAM) that is accessible to both computing systems. Memory pool 140 may be further connected to storage 160.

In the exemplary embodiment, memory pool 140 includes some shared virtual memory 142, which may be accessible to both first computing system 102 and second computing system 122. As described in further detail below, this shared virtual memory may be associated with instances of virtual machines associated with first computing system 102 and/or second computing system 122.

Memory pools, or shared memory, can be implemented using various architectures. In some embodiments, NVIDIA's NVLink, which provides a high-speed link between video cards, may be used as part of a memory pool architecture. Other embodiments may utilize components of NVIDIA's Big Accelerator Memory architecture, which enables NVIDIA GPUs to fetch data directly from system memory and storage without using the CPU.

On each computing system, a corresponding hypervisor may run as software on the hardware (e.g., processors and memory) to create and supervise one or more virtual machines. In particular, each hypervisor allocates portions of the physical computing components, to create distinct virtual processors, virtual memory, and other virtual resources, which are then assigned for use by different virtual machines. Moreover, each virtual machine may be associated with a virtual machine configuration, including CPU allocations and settings, memory allocation and settings, storage allocation and settings, peripheral device settings, boot order settings, communication adapter and ports settings (serial port, parallel port, USB, network adapter, etc.), startup settings as well as other suitable settings.

In some embodiments, rather than using hypervisors run locally on each computing system, one or more external hypervisors (such as external hypervisor 165) could be used, which may reside on external servers and direct virtual machines remotely. In still other embodiments, a hypervisor cluster could be used, which spans a plurality of computing systems associated with one or more virtual machines.

Some embodiments may also be associated with a separate external manager 170. In some cases, external manager 170 could communicate with first computing system 102 and second computing system 122. In embodiments where first computing system 102 and second computing system 122 are nodes in a data center, external manager 170 could be a data center orchestrator.

The embodiments are not limited to two computing systems sharing a memory pool. Other embodiments could include three, four, or any suitable number of computing systems that all share the same memory pool.

The exemplary architecture described above could have a variety of different physical configurations. In some embodiments, each of the first and second computing systems could comprise individual servers arranged in a data rack. The memory pool may also be configured as a standalone server or dedicated component that is located on the same data rack. To minimize the average latency of calls to memory from either computing system, the memory pool could be arranged centrally within the rack. In embodiments with more than two servers on a single data rack, the memory pool could be located approximately at a midpoint so that average latency is minimized across the data rack. In some embodiments, computing systems could be connected to a shared memory pool using Computer Express Link (CXL) connections.

Figure 2:
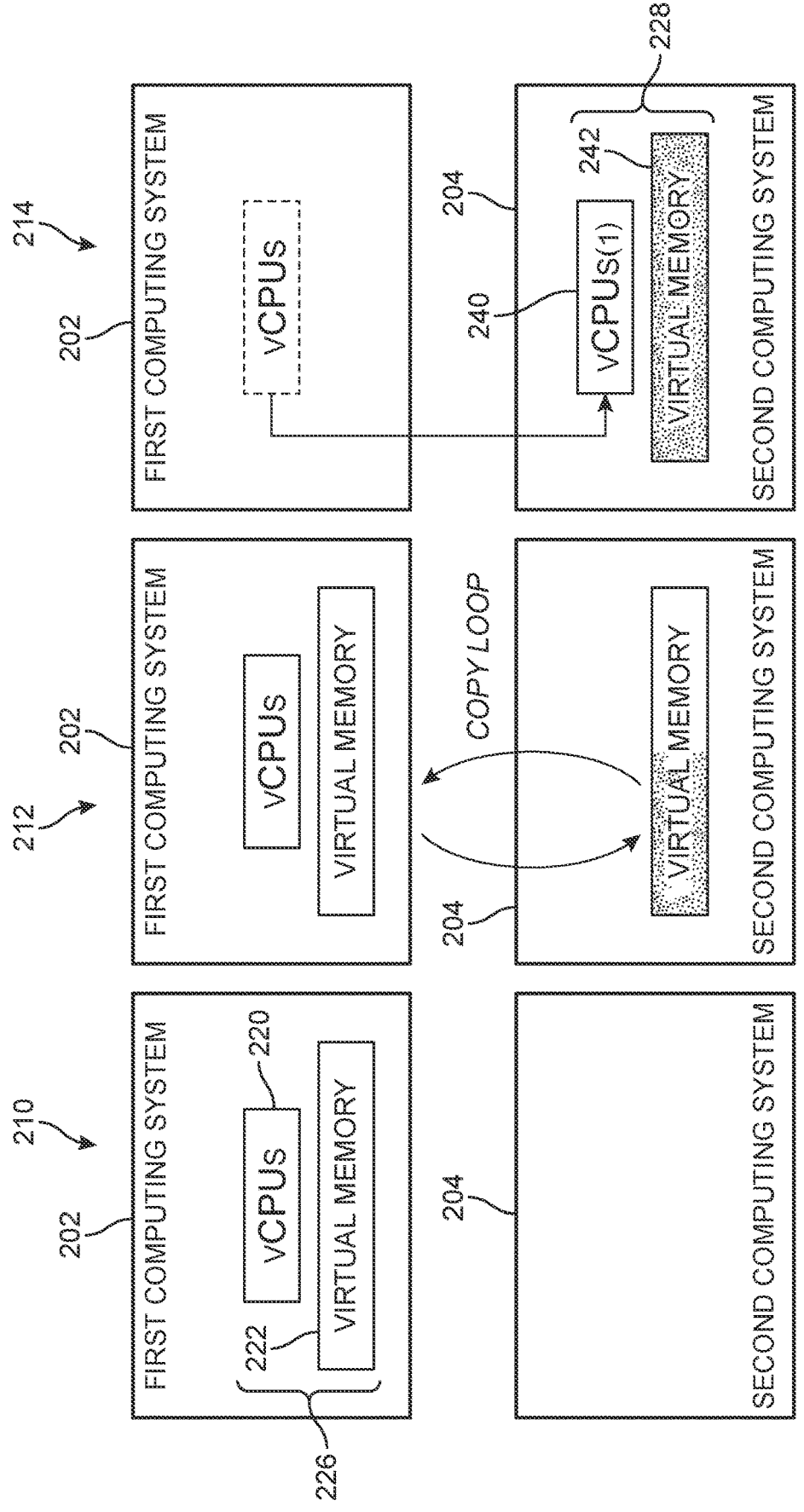
FIG. 2 is a schematic view of a process of migrating a virtual machine from a first computing system to a second computing system, according to an embodiment.

FIG. 2 is a schematic view of a process of migrating a virtual machine from a first computing system 202 to second computing system 204. In the example of FIG. 2, first computing system 202 and second computing system 204 each include local memory and do not share access to any memory pool (in contrast with the embodiment of FIG. 1).

FIG. 2 depicts an initial state 210 of the two computing systems, an intermediate state 212 of the computing systems, and a final state 214 of the two computing systems. These different states may comprise states of a migration process for moving a first virtual machine instance running on first computing system 202 to a second virtual machine instance 228 running on second computing system 204.

During initial state 210, both virtual CPUs (vCPUs 220) and virtual memory 222 are implemented within first computing system 202, and together comprise a first virtual machine instance 226. Although not shown, first virtual machine instance 226 may also comprise additional virtual resources, such as virtual I/O resources.

Once a migration process has been initiated, virtual resources, including the configurations and/or states of any virtual processors, registers, and the contents of any virtual memory, must be copied from first computing system 202 to second computing system 204. Copying the contents of the virtual memory from one computing system to another computing system may both resource and time intensive. Copying the contents of virtual memory requires copying pages and/or page tables from a memory location accessible to the source system to a memory location accessible to the target system. When performing live migrations between source and target computing systems, the migration process involves not only the task of copying over page tables, but also of tracking how the pages within the page tables on the source machine may have been changed while the copying process is ongoing. In particular, the migration process will comprise at least the three following types of tasks: page copying, page walking, and page tracking. Page copying refers to the task of copying designated pages from memory on a source system to memory on a target system. Page walking refers to (iterative) the task of searching through page tables and identifying any pages whose contents have changed (so called "dirty pages") on the source system while the copying process is still ongoing. Page tracking refers to the task of tracking how many dirty pages currently reside on the source system. In some cases, page tracking further includes monitoring when the number of dirty pages (or a ratio of dirty pages to total pages) is above or below a predetermined threshold.

Once the migration process has been initiated, virtual memory associated with first virtual machine instance 226 may be copied to second computing system 204, which is depicted in intermediate state 212. As mentioned, this copying process may be both time and resource intensive, and generally requires the hypervisor to preform a copy loop in which recently dirtied pages are continuously copied over to ensure the pages on the target system are up to date. Depending on the size of the virtual memory to be copied, and data transfer speeds, this stage of the migration process could take minutes, hours, or even longer.

Once a sufficient percentage of all dirtied page tables have been copied over, the hypervisor may temporarily pause the instance of the virtual machine running on first computing system 202 to do a final copy of the remaining virtual resources. In particular, all remaining dirtied page tables can be copied over as well as other virtual resources, such as virtual CPU configurations and states, and other associated data. It may be appreciated that copying over the virtual CPU configurations and states, and other virtual computing data may be sufficiently less time intensive than copying virtual memory, as the amount of information characterizing the virtual machine state (for example, the states of any virtual processors and virtual I/O components) may be substantially smaller than the amount of information stored in virtual memory. Depending on the number of dirty pages left to be copied over and the transfer speeds available, the final copying phase could be completed on the order of minutes, seconds, or even less.

With the final copy completed, as in final state 214, a new copy of the virtual CPU state (vCPU 240) and a full copy of virtual memory 242 reside entirely on second computing system 204, and together comprise a second virtual machine instance 228. In particular, second virtual machine instance 228 can be started on second computing system 204. Moreover, if useful, the virtual machine resources residing on first computing system 202 can be deleted.

In the example of FIG. 2, virtual memory may be copied prior to copying over other virtual computing resources (such as the states of any vCPUs and associated registers). However, in other implementations of migration, vCPUs and other virtual computing resources can be copied prior to copying virtual memory.

Figure 3:
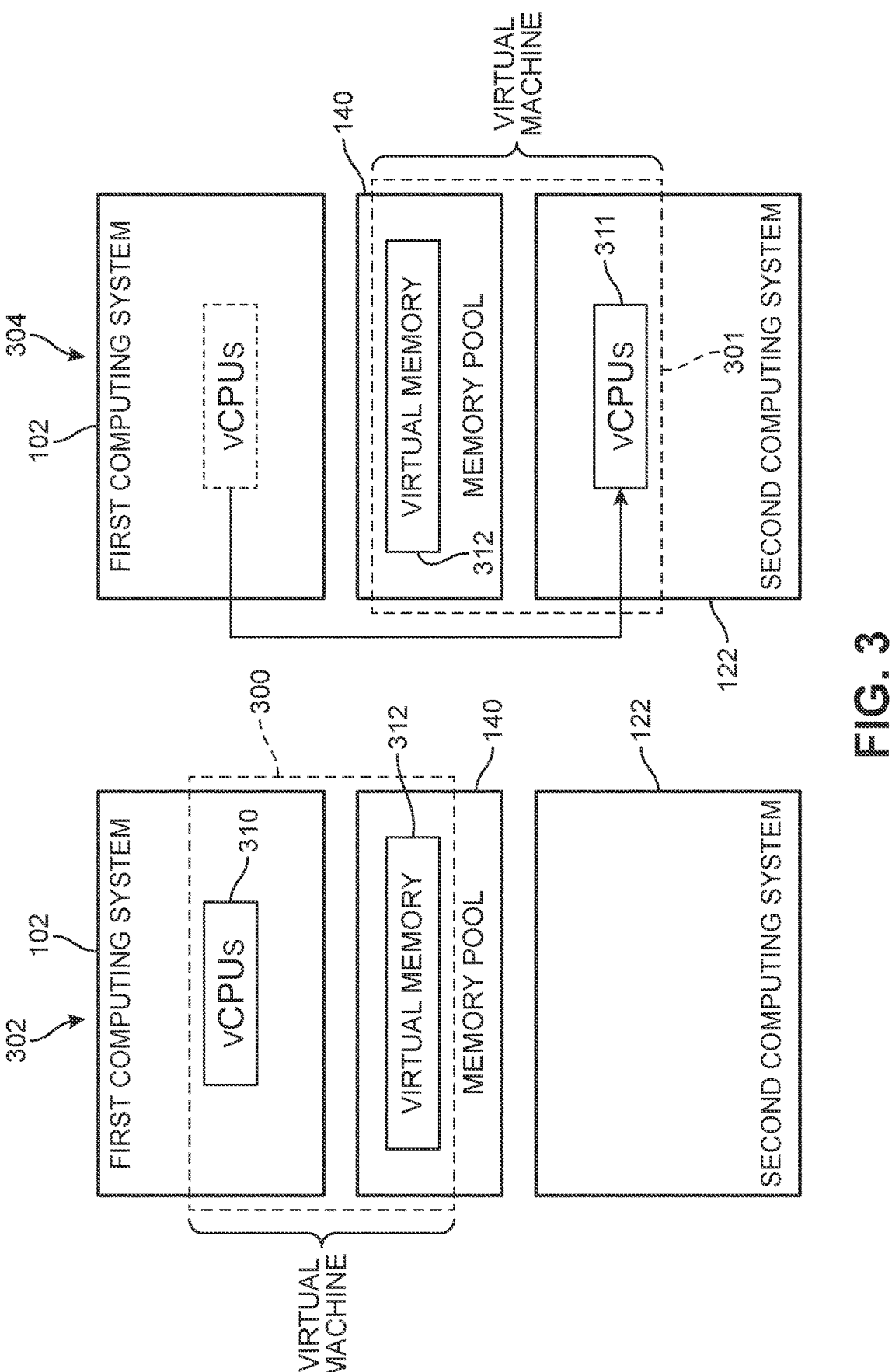
FIG. 3 is an exemplary embodiment of a migration process that uses memory pools, according to an embodiment.

FIG. 3 is an exemplary embodiment of a migration process that uses memory pools to drastically reduce migration time and computing efficiency, as compared to conventional architectures.

Referring to FIG. 3, in a first state 302 of the exemplary architecture, a first virtual machine instance 300 is distributed across first computing system 102 and memory pool 140. In particular, virtual CPUs 310 are allocated from processors associated with first computing system 102. Virtual memory 312 is allocated from physical memory associated with memory pool 140.

Because virtual memory 312 is shared with both first computing system 102 and second computing system 122, virtual memory 312 does not have to be copied in migrating first virtual machine instance 300 to a second virtual machine instance 301 on second computing system 122. Instead, as shown in second state 304 of the exemplary architecture, only virtual CPUs 310, and other computing resources, must be copied from first computing system 102 to second computing system 122. Once the computing resources have been copied over (virtual CPUs copy 311), second virtual machine instance 301 is ready to run on second computing system 122. Using this configuration, as second virtual machine instance 301 is executed, it has immediate access to virtual memory 312 residing in memory pool 140. Thus, the exemplary architecture allows for near immediate migration of a virtual machine by avoiding the intermediate copy loop that must be performed using other architectures, such as the architecture shown in the embodiment of FIG. 2.

Figure 4:
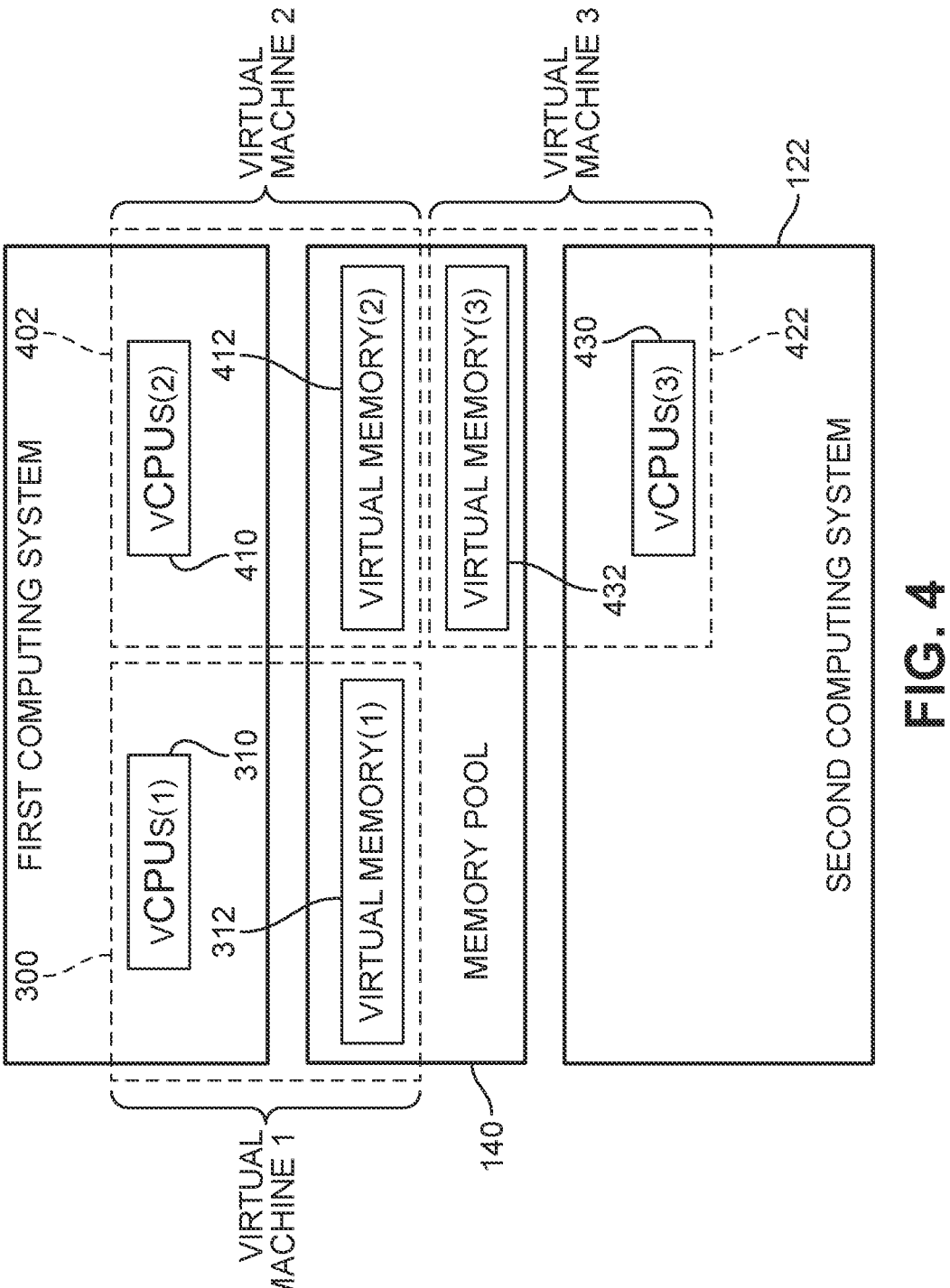
FIG. 4 depicts an exemplary configuration with three different virtual machine instances having virtual memory allocated from a memory pool, according to an embodiment.

FIG. 4 depicts an exemplary configuration with three different virtual machine instances having virtual memory allocated from a memory pool. Referring to FIG. 3, first virtual machine instance 300 includes first virtual CPUs 310 associated with first computing system 102 and virtual memory 312 associated with memory pool 140. A second virtual machine instance 402 includes second virtual CPUs 410 associated with first computing system 102 and second virtual memory 412 associated with memory pool 140. A third virtual machine instance 422 includes third virtual CPUs 430 associated with second computing system 122 and third virtual memory 432 associated with memory pool 140. In other words, memory pool 140 stores some or all of the virtual memory of three different virtual machine instances, including virtual machine instances running on two different computing systems. In such a configuration it is possible to migrate virtual machine instances between any two computing systems that share the same memory pool.

Figure 5:
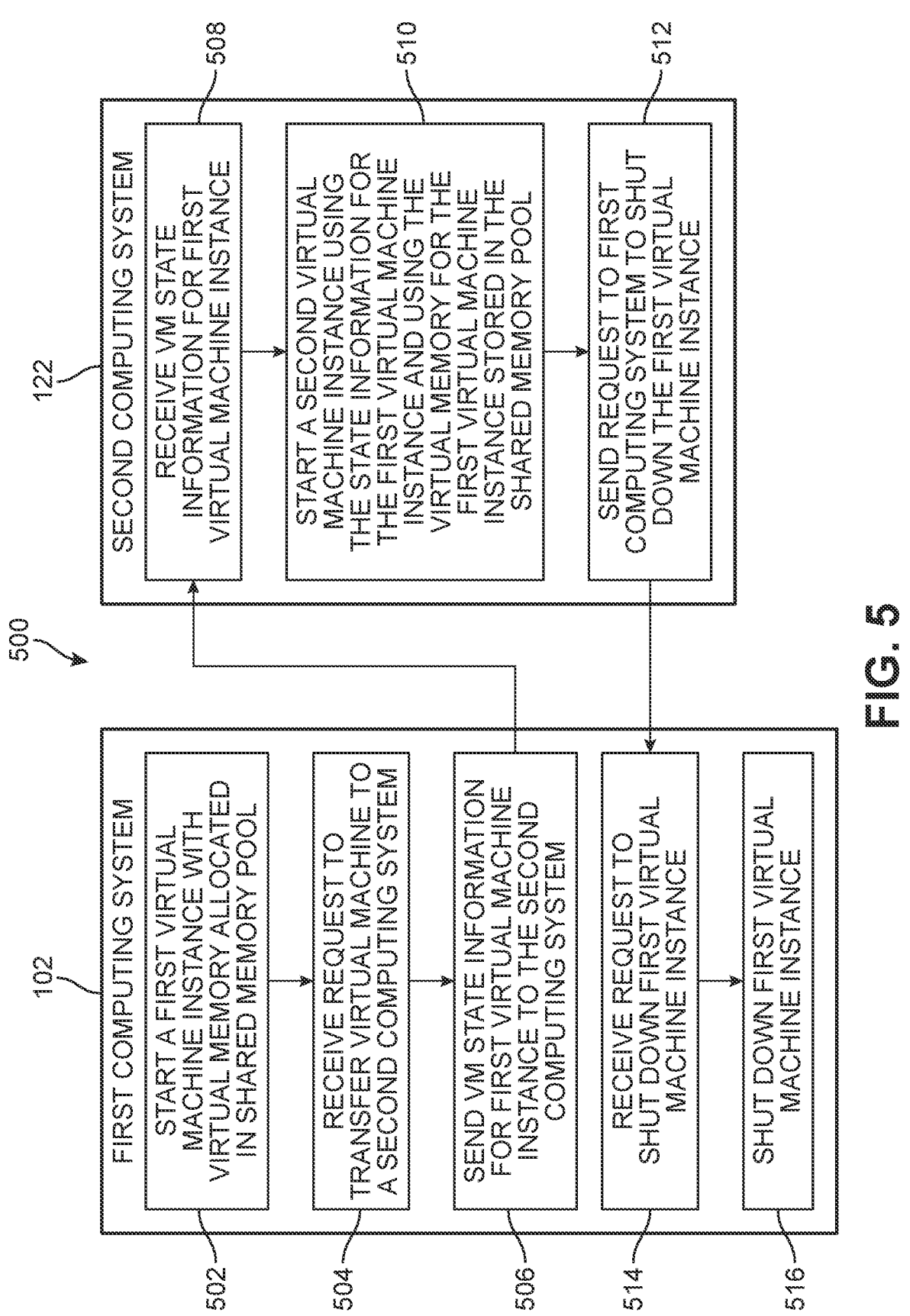
FIG. 5 is a schematic view of a process of migrating a virtual machine instance from one computing system to another, according to an embodiment.
Figure 6:
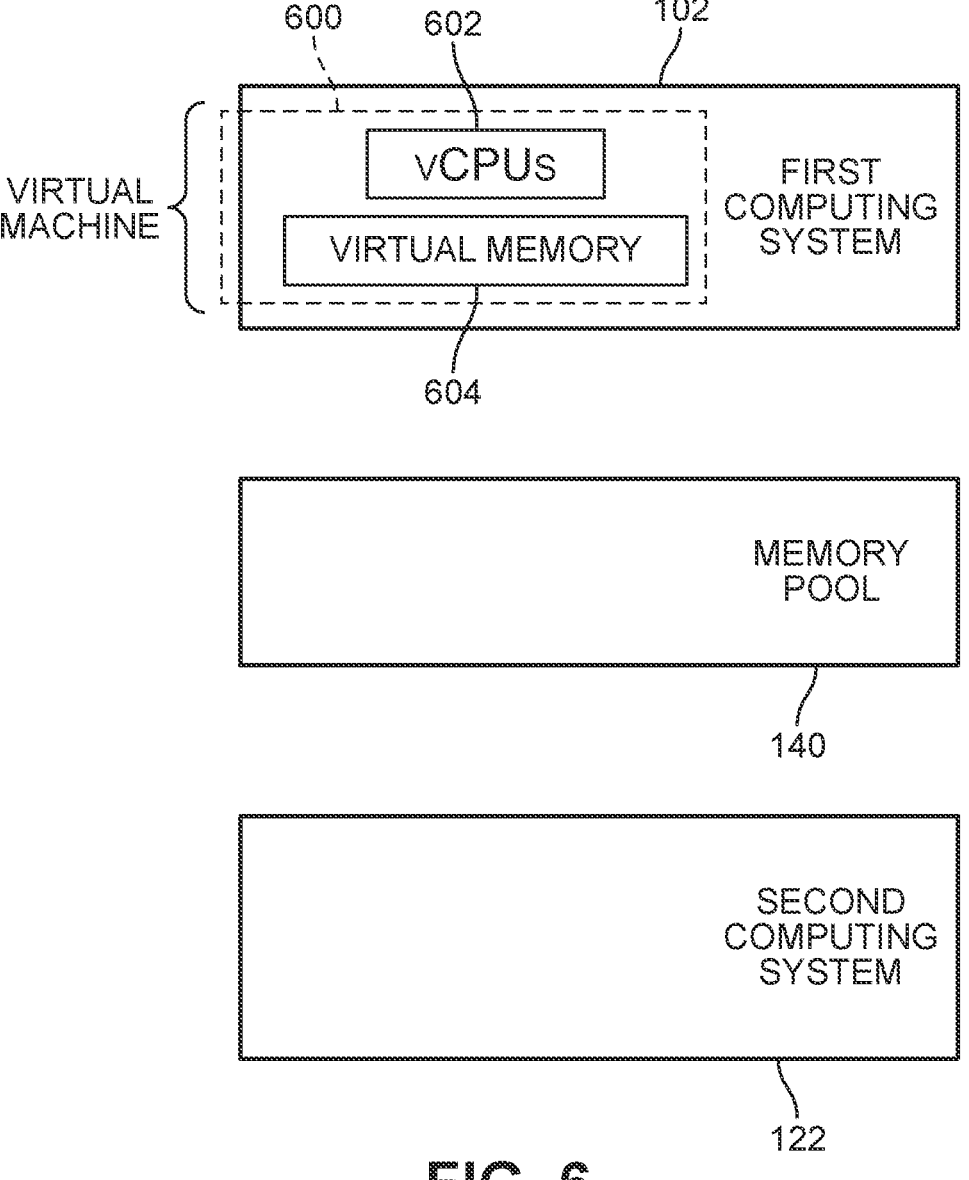
FIGS. 6-9 show a staged migration process from a first computing system to a second computing system, according to an embodiment.

FIG. 5 is a schematic view of a process 500 of migrating a virtual machine instance from one computing system to another, according to an embodiment. In some cases, one or more of the following operations could be performed by hypervisors running on the respective machines. For example, some operations performed by first computing system 102 may be performed by first hypervisor 106 (see FIG. 1). Likewise, some operations performed by second computing system 122 may be performed by second hypervisor 126.

Starting in operation 502, first computing system 102 may start a first virtual machine instance with virtual memory allocated in a shared memory pool (such as memory pool 140). In operation 504, first computing system 102 may receive a request to transfer the virtual machine to second computing system 122. In some cases, the request may be received by an external hypervisor and/or external manager such as a data center orchestrator.

In operation 506, first computing system 102 may send virtual machine state information for the first virtual machine instance to second computing system 122. This virtual machine state information could include information about any virtual resources, including processor and/or register states, I/O device states, as well as other suitable information. However, it may be appreciated that because the virtual memory of the first virtual machine instance resides on the shared memory pool already, it is unnecessary to copy the virtual memory (including pages and page tables) between the computing systems.

In operation 508, second computing system 122 may receive the virtual machine state information for the first virtual machine instance. It may be appreciated that in some cases second computing system 122 could retrieve this state information, rather than passively receiving the information.

In operation 510, second computing system 122 may start a second virtual machine instance. This virtual machine instance may be configured according to the virtual machine state information received previously. Moreover, the second virtual machine instance has immediate access to the virtual memory stored in the memory pool.

In operation 512, second computing system 122 sends a request to the first computing system to shut down the first virtual machine instance. The request is received at first computing system 102 in operation 514. The first virtual machine instance may be shut down in operation 516. In some cases, the first virtual machine instance may not be completely shut down. Instead, once the new virtual machine instance is running on the second computing system, one or more components of the first virtual machine instance running on the first computing system can be released.

It may be appreciated that the migration processes described above may be used to migrate a virtual machine between any two computing systems with access to a common memory pool.

The exemplary architecture allows for migration even when the virtual memory is not already located in shared memory. As an example, FIGS. 6-9 show a process where a virtual machine is migrated from first computing system 102 to second computing system 122 in stages. In an initial configuration, shown in FIG. 6, a virtual machine instance 600 is hosted on first computing system 102. In particular, both virtual CPUs 602 and virtual memory 604 are associated with physical computing resources (such as processors and memory) that reside on first computing system 102. In this configuration, virtual memory 604 is accessible only by first computing system 102 and is inaccessible to second computing system 122.

Figure 7:
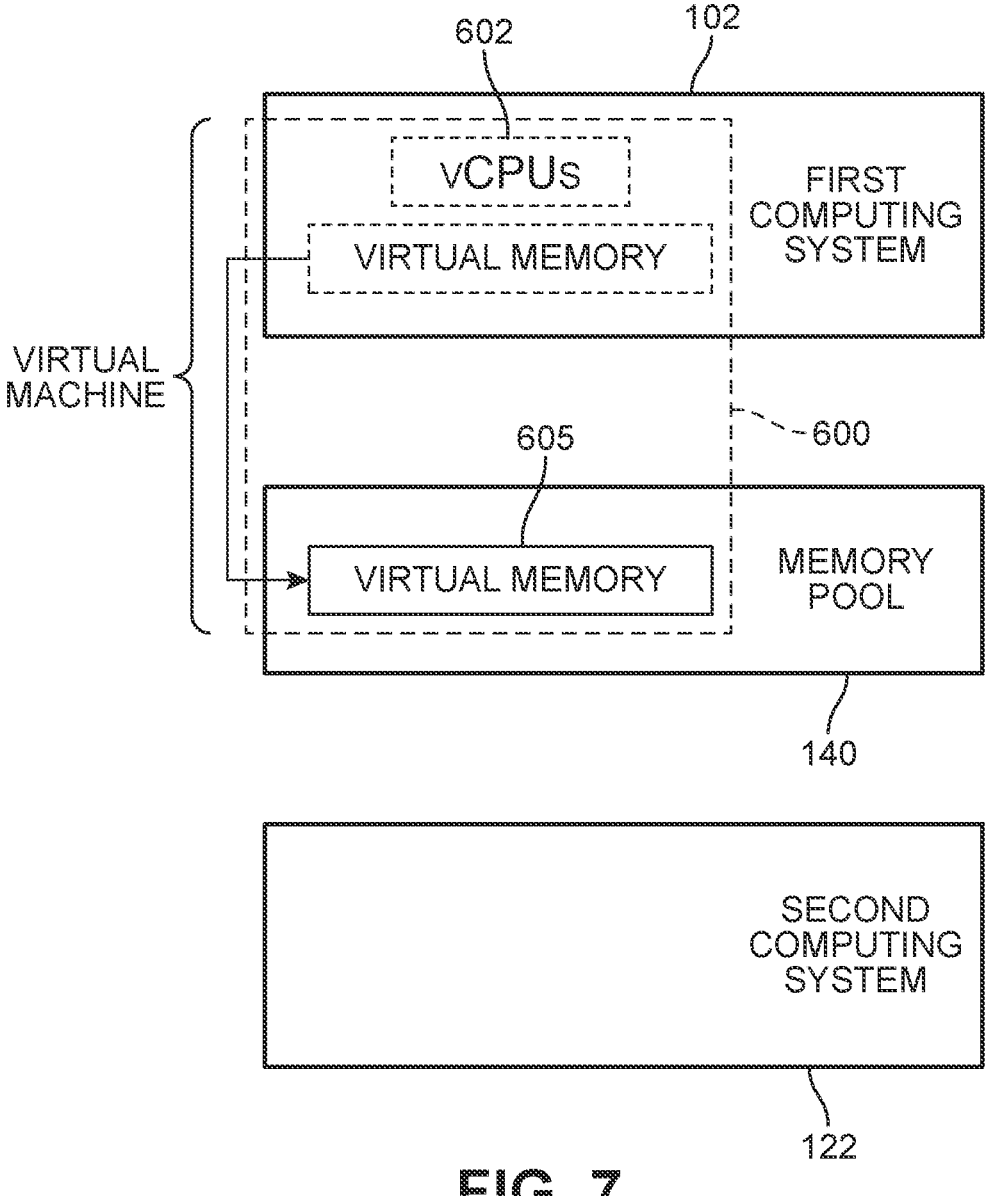

Migration of virtual machine instance 600 from first computing system 102 to second computing system 122 may proceed by first copying virtual memory 604 from first computing system 102 to memory pool 140, resulting in copied virtual memory 605, as in FIG. 7. This process of copying virtual memory 604 may include having the hypervisor iteratively copy over pages and page tables from memory even while first virtual machine instance 600 is running on first computing system 102.

Figure 8:
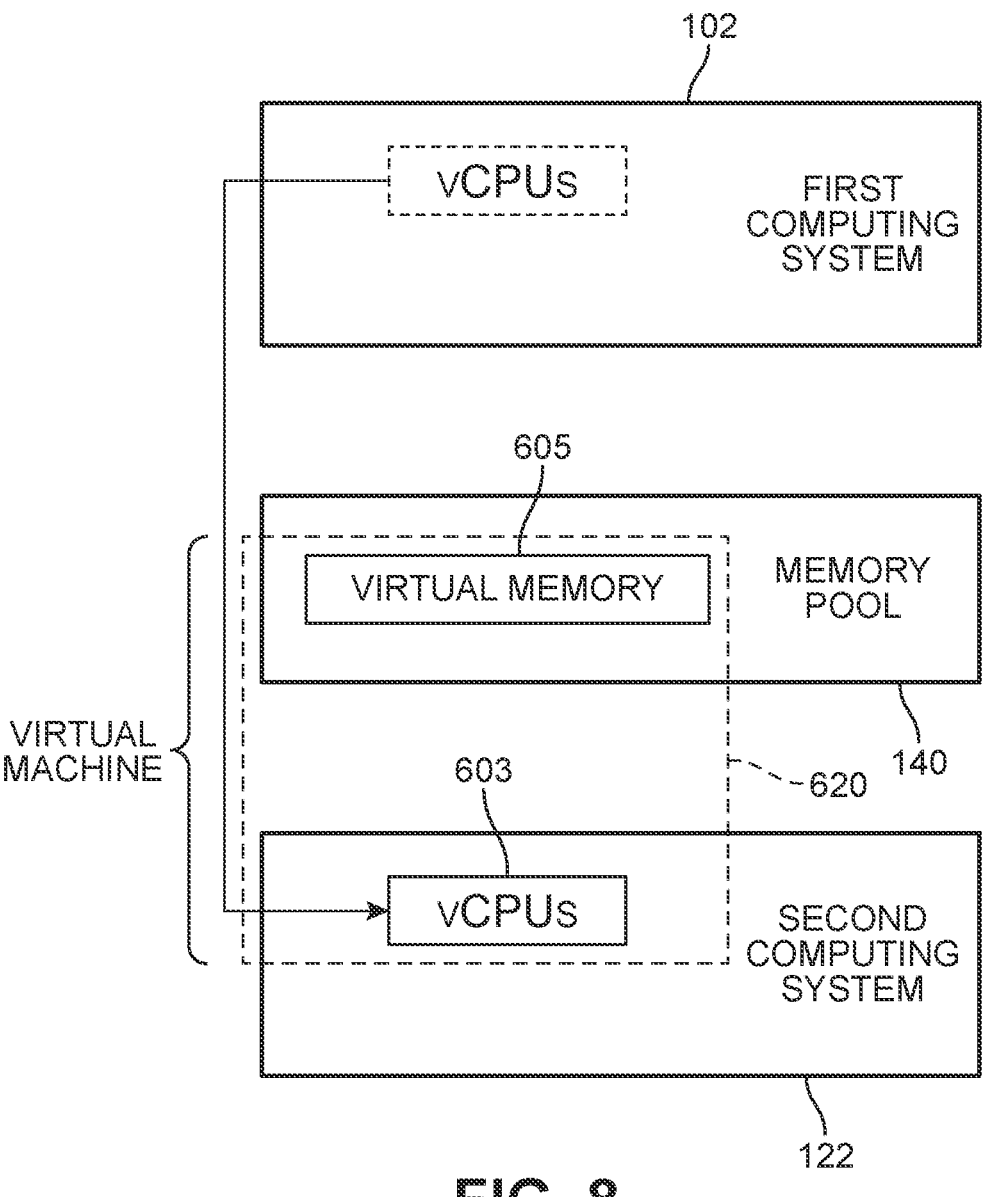

Once virtual memory 604 has been copied to memory pool 140, state information about virtual CPUs 602 can be copied from first computing system 102 to second computing system 122, resulting in copied virtual CPUs 603, as in FIG. 8. At this point, a new instance of the virtual machine (virtual machine instance 620) can be started. Virtual machine instance 620 includes virtual processing resources located on second computing system 122 and virtual memory residing in memory pool 140.

Figure 9:
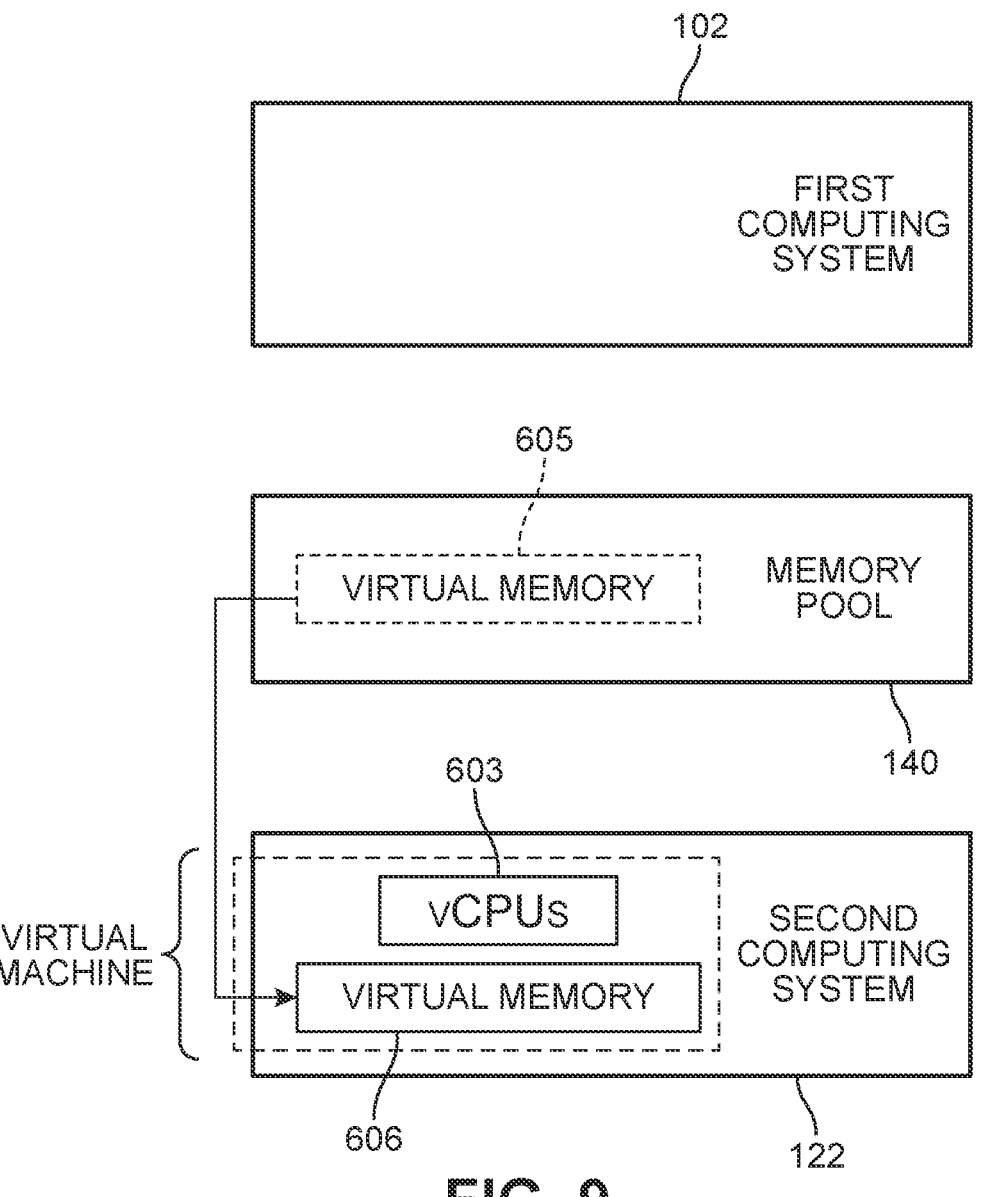

In some cases, virtual memory 605 can be copied from memory pool 140 to second computing system 122, resulting in copied virtual memory 606, as shown in FIG. 9. In this configuration, virtual memory 606 is no longer accessible by first computing system 102. Specifically, while a copy of the virtual memory (virtual memory 605) may be accessible to first computing system 102 from memory pool 140, this copy of virtual memory will no longer be up-to-date, as only the virtual memory stored at second computing system 122 is continuously updated within second virtual machine instance 620.

This last operation of moving virtual memory from the memory pool to the second computing system may be useful when there are reasons to avoid keeping virtual memory in the memory pool, for example due to security or privacy concerns, or because the memory pool is only available temporarily.

The staging process shown in FIGS. 6-9 may be utilized, for example, when it is anticipated that a virtual machine will need to be migrated quickly at a future time and when the destination computing system is not known ahead of time. In this instance, the virtual memory for the virtual machine can be moved to a memory pool shared with one or more other computing systems. Once the virtual memory has been copied to the memory pool, the virtual machine can be migrated quickly to any other system with access to the memory pool at a later time.

It may be appreciated that not all memory in a memory pool may be accessible to every system that is connected to the memory pool. In some cases, data can be private or shared. Shared data may be accessible to two or more computing systems while private data may only be accessible to some computing systems. In some cases, prior to migrating a virtual machine, the accessibility of any virtual memory stored in the memory pool could be set to private so that only the source computing system has access to the virtual memory. The accessibility can be changed to shared during the migration process, and then after the migration process has completed, the accessibility can be set to private again so that only the target computing system has access to the virtual memory.

Figure 10:
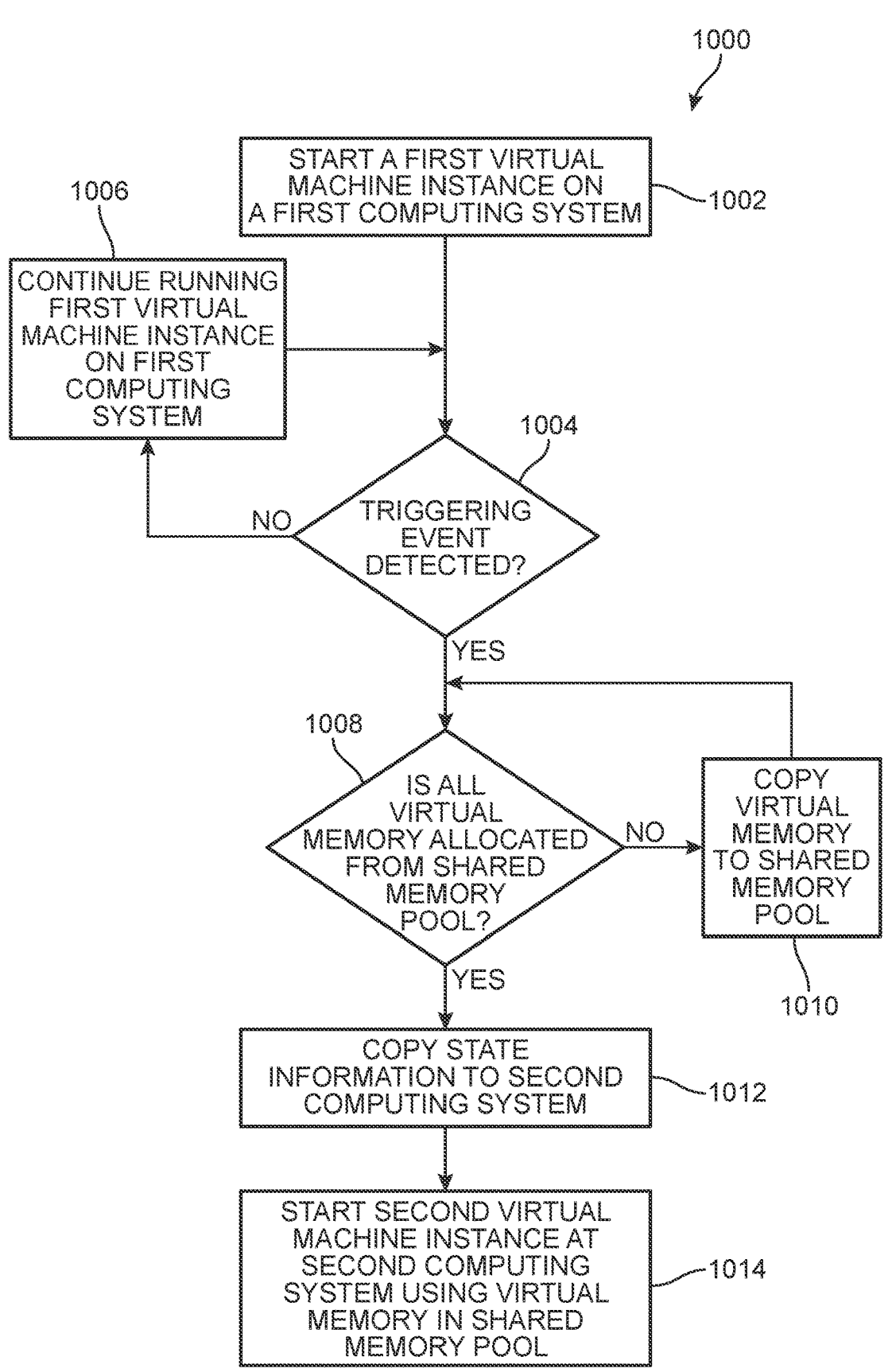
FIG. 10 is a schematic view of a process for migrating a virtual machine in response to detecting a trigger, according to an embodiment.

A system may be configured to detect triggers for virtual machine migration. In some cases, detecting triggers such as possible software and hardware issues effecting one or more components of the system, allows for migration of a virtual machine very quickly before these issues effect the virtual machine. FIG. 10 is a schematic view of a process 1000 for migrating a virtual machine in response to detecting a trigger. For convenience, the following describes operations that may be performed by a "system" associated with the exemplary architecture. In this context the system could be a hypervisor, a data center orchestrator, an external manager, or any other suitable system associated with a migration process. Moreover, in some cases different operations could be performed by different systems. For example, an external manager may check for external triggers while a hypervisor may oversee a migration process in response to instructions from the external manager.

In operation 1002, a first virtual machine instance may be initiated on a first computing system. While the first virtual machine instance is running, a system checks for a triggering event (operation 1004). This check could be performed by a hypervisor or other suitable system. In some cases, this check could be performed by a data center orchestrator or an external manager.

If no trigger is detected, the first virtual machine instance may continue running in operation 1006, and a system may continue iteratively checking for a triggering event in operation 1004.

When a triggering event is detected, a system, such as the hypervisor, checks to see if all the virtual memory for the first virtual machine instance is stored in the shared memory pool in operation 1008. If not, some or all of the memory stored elsewhere can be moved to the memory pool in operation 1010.

Once it is determined that all virtual memory is stored in the shared memory pool in operation 1008, the remaining virtual machine state information can be copied over to the second computing system in operation 1012.

In operation 1014, the second virtual machine instance can be started on the second computing system using the virtual memory already stored in the shared memory pool.

Figure 11:
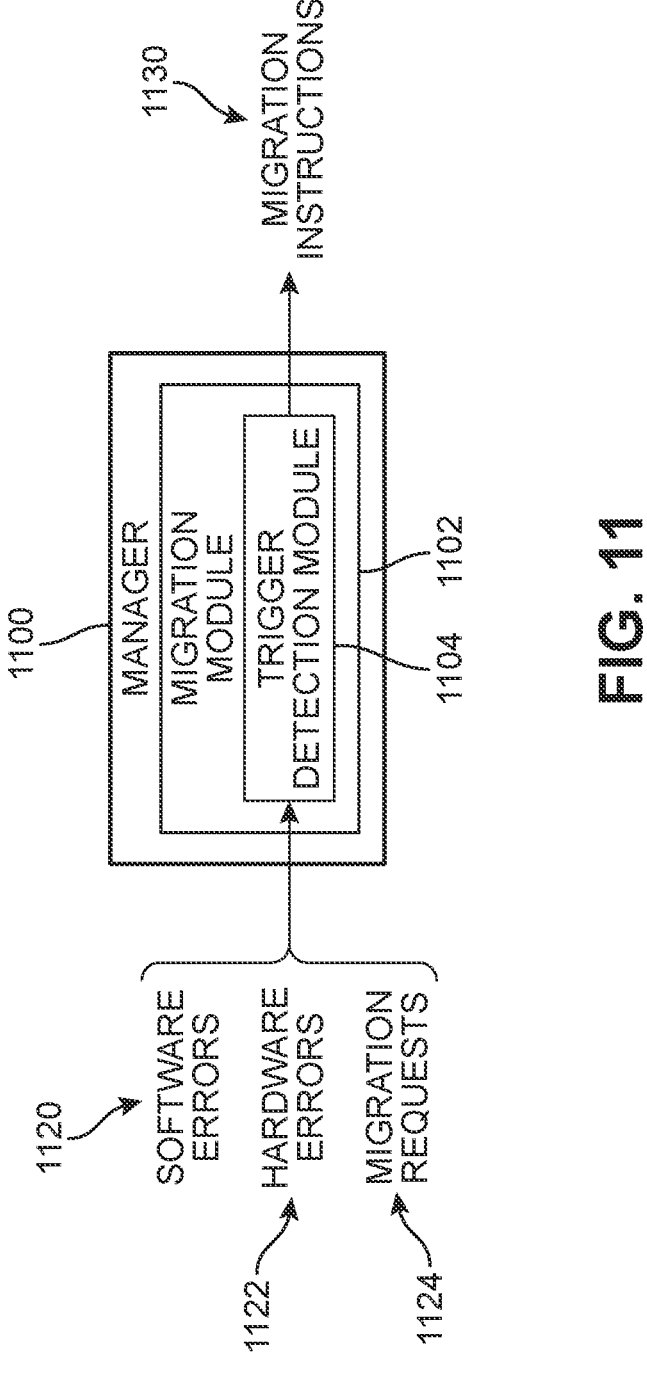
FIG. 11 is a schematic view of a component that checks for migration triggers, according to an embodiment.

FIG. 11 is a schematic view of a component that may check for triggers, according to an embodiment. In this example, a manager 1100 (for example, a data center orchestrator) includes a migration module 1102 that manages tasks related to initiating migration of virtual machines between different computing systems. Migration module 1102 further includes a trigger detection module 1104, which is specifically dedicated to monitoring information that may be analyzed to identify migration triggers.

Trigger detection module 1104 may receive various inputs associated with different kinds of migration triggers and generate migration instructions 1130 in response. A migration trigger may be any indicator that some process or component in the architecture may fail or otherwise cause problems that could interfere with the virtual machine. As an example, some types of software errors at the hypervisor level may lead to issues with the virtual machine. Likewise, some types of hardware issues may also lead to issues with the virtual machine.

Some indicators are suggestive of pending software and/or hardware issues. That is, issues that may occur in the near future, but which have not occurred yet. Such triggers may allow the virtual machine to be migrated quickly (by utilizing the shared memory architecture) before the detected issues interfere with operation, or even cause the failure, of the virtual machine. In some cases, trigger detection module 1104 may receive information related to potential software errors 1120. In some cases, for example, trigger detection module 1104 can monitor parameters indicative of problems with the hypervisor and/or other programs and processes running on the source computing system where the virtual compute for the virtual machine instance is maintained. Similarly, in some cases, trigger detection module 1104 may receive information related to potential hardware errors 1122. In some cases, for example, trigger detection module 1104 can monitor parameters that may be predictive of future hardware issues for components of the source computing system. If trigger detection module 1104 detects either software errors 1120 or hardware errors 1122, the module may generate instructions to migrate the virtual machine instance. This allows a new virtual machine instance to be started on another computing system before the current virtual machine has issues and/or crashes.

Examples of triggers that may be monitored by a suitable system in order to automatically initiate migration include, but are not limited to: temperature indicators, security indicators, error correction code indicators, and RAS (reliability, availability, and serviceability) indicators. For example, a system may monitor temperatures associated with a computing system, server, rack, and/or region of a data center and automatically initiate migration if the temperatures fall outside of a predetermined operating range. As another example, a system could monitor internal or external information indicating that there is a security vulnerability in a source computing system and automatically initiate migration of one or more virtual machines to one or more target computing systems in response. As another example, a system could monitor indicators such as the number of bad pages in a virtual memory table, and automatically initiate migration to a target computing system when the number of bad pages exceeds a predetermined threshold.

Trigger detection module 1104 may also receive migration requests 1124 from other systems. As an example, a data center orchestrator could send manager 1100 a request to migrate a virtual machine because of pending system maintenance for the source computing system where the virtual machine is currently hosted.

The exemplary processes described above and shown, for example, in FIG. 10, may not be possible using migration processes that require most or all of the virtual memory to be copied between systems during the migration, such as the process depicted in FIG. 2. For many kinds of software and hardware issues, there may not be sufficient time between when the trigger is detected and when the virtual machine fails to complete a full copy of the virtual memory. By contrast, the exemplary architecture (for example, the architecture of FIG. 1) allows the virtual machine to be migrated very quickly since virtual memory need not be copied over during migration.

The processes and methods of the embodiments described in this detailed description and shown in the figures can be implemented using any kind of computing system having one or more central processing units (CPUs) and/or graphics processing units (GPUs). The processes and methods of the embodiments could also be implemented using special purpose circuitry such as an application specific integrated circuit (ASIC). The processes and methods of the embodiments may also be implemented on computing systems including read only memory (ROM) and/or random access memory (RAM), which may be connected to one or more processing units. Examples of computing systems and devices include, but are not limited to: servers, cellular phones, smart phones, tablet computers, notebook computers, smart watches, smart glasses, e-book readers, laptop or desktop computers, all-in-one computers, as well as various kinds of digital media players.

The processes and methods of the embodiments can be stored as instructions and/or data on non-transitory computer-readable media. The non-transitory computer readable medium may include any suitable computer readable medium, such as a memory, such as RAM, ROM, flash memory, or any other type of memory known in the art. In some embodiments, the non-transitory computer readable medium may include, for example, an electronic storage device, a magnetic storage device, an optical storage device, an electromagnetic storage device, a semiconductor storage device, or any suitable combination of such devices. More specific examples of the non-transitory computer readable medium may include a portable computer diskette, a floppy disk, a hard disk, magnetic disks or tapes, a read-only memory (ROM), a random access memory (RAM), a static random access memory (SRAM), a portable compact disc read-only memory (CD-ROM), an erasable programmable read-only memory (EPROM or Flash memory), electrically erasable programmable read-only memories (EEPROM), a digital versatile disk (DVD and DVD-ROM), a memory stick, other kinds of solid state drives, and any suitable combination of these exemplary media. A non-transitory computer readable medium, as used herein, is not to be construed as being transitory signals, such as radio waves or other freely propagating electromagnetic waves, electromagnetic waves propagating through a waveguide or other transmission media (e.g., light pulses passing through a fiber-optic cable), or electrical signals transmitted through a wire.

Instructions stored on the non-transitory computer readable medium for carrying out operations of the present disclosure may be instruction-set-architecture (ISA) instructions, assembler instructions, machine instructions, machine dependent instructions, microcode, firmware instructions, configuration data for integrated circuitry, state-setting data, or source code or object code written in any of one or more programming languages, including an object oriented programming language such as Smalltalk, C++, or suitable language, and procedural programming languages, such as the "C" programming language or similar programming languages.

Aspects of the present disclosure are described in association with figures illustrating flowcharts and/or block diagrams of methods, apparatus (systems), and computing products. It will be understood that each block of the flowcharts and/or block diagrams can be implemented by computer readable instructions. The flowcharts and block diagrams in the figures illustrate the architecture, functionality, and operation of possible implementations of various disclosed embodiments. Accordingly, each block in the flowchart or block diagrams may represent a module, segment, or portion of instructions. In some implementations, the functions set forth in the figures and claims may occur in an alternative order than listed and/or illustrated.

The embodiments may utilize any kind of network for communication between separate computing systems. A network can comprise any combination of local area networks (LANs) and/or wide area networks (WANs), using both wired and wireless communication systems. A network may use various known communications technologies and/or protocols. Communication technologies can include, but are not limited to: Ethernet, 802.11, worldwide interoperability for microwave access (WiMAX), mobile broadband (such as CDMA, and LTE), digital subscriber line (DSL), cable internet access, satellite broadband, wireless ISP, fiber optic internet, as well as other wired and wireless technologies. Networking protocols used on a network may include transmission control protocol/Internet protocol (TCP/IP), multiprotocol label switching (MPLS), User Datagram Protocol (UDP), hypertext transport protocol (HTTP), hypertext transport protocol secure (HTTPS) and file transfer protocol (FTP) as well as other protocols.

Data exchanged over a network may be represented using technologies and/or formats including hypertext markup language (HTML), extensible markup language (XML), Atom, JavaScript Object Notation (JSON), YAML, as well as other data exchange formats. In addition, information transferred over a network can be encrypted using conventional encryption technologies such as secure sockets layer (SSL), transport layer security (TLS), and Internet Protocol security (Ipsec).

Other systems, methods, features, and advantages of the disclosure will be, or will become, apparent to one of ordinary skill in the art upon examination of the following figures and detailed description. It is intended that all such additional systems, methods, features, and advantages be included within this description and this summary, be within the scope of the disclosure, and be protected by the following claims.

While various embodiments are described, the description is intended to be exemplary, rather than limiting, and it will be apparent to those of ordinary skill in the art that many more embodiments and implementations are possible that are within the scope of the embodiments. Although many possible combinations of features are shown in the accompanying figures and discussed in this detailed description, many other combinations of the disclosed features are possible. Any feature or element of any embodiment may be used in combination with or substituted for any other feature or element in any other embodiment unless specifically restricted.

This disclosure includes and contemplates combinations with features and elements known to the average artisan in the art. The embodiments, features, and elements that have been disclosed may also be combined with any conventional features or elements to form a distinct disclosure as defined by the claims. Any feature or element of any embodiment may also be combined with features or elements from other disclosures to form another distinct disclosure as defined by the claims. Therefore, it will be understood that any of the features shown and/or discussed in the present disclosure may be implemented singularly or in any suitable combination. Accordingly, the embodiments are not to be restricted except in light of the attached claims and their equivalents. Also, various modifications and changes may be made within the scope of the attached claims.

We claim:

1. A method, comprising:
 executing a first virtual machine instance on a first computing system, the first virtual machine instance including a virtual central processing unit (vCPU) stored in local memory of the first computing system and virtual memory corresponding to located in a shared memory pool accessible by the first computing system and a second computing system;
 copying information corresponding to the vCPU from the local memory of the first computing system to a second local memory of the second computing system;
 instantiating a second virtual machine instance on the second computing system, instantiating the second virtual machine instance comprising:
 using the vCPU stored in the second local memory of the second computing system; and
 accessing, by the second virtual machine instance during execution, the virtual memory from the shared memory pool without transferring the virtual memory from the shared memory pool to the local memory of the second computing system.

2. The method according to claim 1, wherein the first virtual machine instance and the second virtual machine instance have simultaneous access to the virtual memory in the shared memory pool.

3. The method according to claim 1, wherein the first computing system is configured to detect a triggering event for migrating the first virtual machine instance to the second computing system, and wherein the triggering event may include detection of at least one of: an error correction code indicator, or a Reliability, Availability, and Serviceability (RAS) indicator.

4. The method according to claim 1, further comprising copying information associated with the first virtual machine instance from an initial memory location to the shared memory pool, wherein the initial memory location is inaccessible to the second computing system.

5. The method according to claim 4, wherein the copying the information occurs while the first virtual machine instance is executing on the first computing system and prior to instantiating the second virtual machine instance on the second computing system.

6. The method according to claim 1, wherein the first computing system and the second computing system are servers on a data rack, and wherein the shared memory pool is located on the data rack.

7. The method according to claim 1, further comprising copying information associated with the second virtual machine instance running on the second computing system from the shared memory pool to a new memory location, wherein the new memory location is inaccessible to the first computing system.

8. The method according to claim 1, further comprising changing the accessibility of the virtual memory from private to shared after starting the first virtual machine instance on the first computing system.

9. The method according to claim 1, further comprising changing the accessibility of the virtual memory from shared to private after starting the second virtual machine instance on the second computing system.

10. A method, comprising:
 executing a first virtual machine instance on a first computing system, the first virtual machine instance including a virtual central processing unit (vCPU) stored in local memory of the first computing system and virtual memory located in a shared memory pool accessible by the first computing system and a second computing system;

detecting a triggering event;

performing, in response to detecting the triggering event, a migration of the first virtual machine instance from the first computing system to the second computing system, by:

copying information corresponding to the vCPU from the local memory of the first computing system to a second local memory of the second computing system; and and instantiating a second virtual machine instance on the second computing system, wherein instantiating the second virtual machine instance comprises:

using the vCPU stored in the second local memory of the second computing system; and accessing, by the second virtual machine instance during execution, the virtual memory from the shared memory pool without transferring the virtual memory from the shared memory pool to the local memory of the second computing system.

11. The method according to claim 10, wherein detecting the triggering event includes at least one of detecting a software error, detecting a hardware error, or receiving a migration request.

12. The method according to claim 10, wherein the triggering event includes detection of at least one of: an error correction code indicator, or a Reliability, Availability, and Serviceability (RAS) indicator.

13. The method according to claim 12, wherein the first virtual machine instance and the second virtual machine instance have simultaneous access to the virtual memory in the shared memory pool.

14. A system, comprising:

a first computing system configured to execute a first virtual machine instance including a virtual central processing unit (vCPU) stored in local memory of the first computing system and using virtual memory located in a shared memory pool, wherein the shared memory pool is accessible to the first computing system and a second computing system; and the second computing system configured to instantiate a second virtual machine instance by:

receiving and storing information corresponding to the vCPU from the local memory of the first computing system in a second local memory of the second computing system;

using the vCPU stored in the second local memory of the second computing system; and accessing, by the second virtual machine instance during execution, the virtual memory from the shared memory pool without transferring the virtual memory from the shared memory pool to the local memory of the second computing system.

15. The system according to claim 14, wherein the first computing system comprises one or more first servers, wherein the second computing system comprises one or more second servers, and wherein the shared memory pool is physically located outside of the one or more first servers and the one or more second servers.

16. The system according to claim 15, wherein the first virtual machine instance and the second virtual machine instance have simultaneous access to the virtual memory in the shared memory pool.

17. The system according to claim 14, wherein the first computing system is configured to detect a triggering event for migrating the first virtual machine instance to the second computing system, and wherein the triggering event may include detection of at least one of: an error correction code indicator, or a Reliability, Availability, and Serviceability (RAS) indicator.

18. The system according to claim 16, wherein the first virtual machine instance changes the state of a portion of the shared memory pool from a private state to a shared state.

19. The system according to claim 16, wherein the first virtual machine instance changes the state of a portion of the shared memory pool from a shared state to a private state.

20. The system according to claim 16, wherein the second virtual machine changes the state of a portion of the shared memory pool from a shared state to a private state.

* * * * *